United States Patent Office 3,427,336
Patented Feb. 11, 1969

3,427,336
FLUORINE CONTAINING ORGANOSILICON COMPOUNDS AND METHOD OF MAKING
George Van Dyke Tiers, St. Paul, Minn., assignor to Minnesota Mining and Manufacturing Company, St. Paul, Minn., a corporation of Delaware
No Drawing. Continuation-in-part of application Ser. No. 769,061, Oct. 23, 1958. This application Mar. 22, 1965, Ser. No. 441,924
U.S. Cl. 260—448.2     18 Claims
Int. Cl. C07g 7/12

ABSTRACT OF THE DISCLOSURE

Perfluorocarbon substituted organosilanes having at least one readily hydrolyzable radical attached to silicon are prepared by free-radical-induced reaction between a silane having a cyclohexenyl or terminally unsaturated alkenyl radical attached to silicon, and a saturated-fluorocarbon sulfonyl halide, with liberation of $SO_2$. The novel compounds find use as oil, water, and ketone repellants.

---

This application is a continuation-in-part of copending and now abandoned application Ser. No. 769,061 filed Oct. 23, 1958, as a continuation-in-part of application Ser. No. 532,742 filed Sept. 6, 1955, and now abandoned.

This invention relates to the synthesis of fluorine-containing organosilanes and the like in which the fluorine is present as a terminal saturated-fluorocarbon radical such as a perfluoroalkyl or perfluorocycloalkyl radical. In one aspect the invention relates to novel saturated-fluorocarbon organosilicon compounds, capable of imparting both water-repellency and oil-repellency and also ketone-repellency and other unexpected properties, to surfaces of glass or the like treated therewith. The invention relates in particular to novel methods of preparing the saturated-fluorocarbon organosilicon compounds. The preparation of novel telomeric saturated-fluorocarbon organosilicon products and of siloxane derivatives of the saturated-fluorocarbon organosilicon compounds, and the products and derivatives thus prepared, also come within the ambit of the invention.

Compounds such as $CF_3CH_2CHBrSi(CH_3)F_2$ have previously been prepared. For example, Gordon U.S. Patent No. 2,715,113 describes the preparation of this and other similar compounds by reacting together a vinyl silane and a perhalogenated carbon compound containing one or two carbon atoms and at least one bromine or iodine atom. The resulting compounds have been recommended by the pantentee "for water-repelling materials," but are not effective, and are not recommended, for imparting repellency to oil or ketones. The reaction unavoidably results in a reaction product having a bromine or iodine atom attached to a carbon atom of the original vinyl radical, and having a perhalogenated terminal radical of not more than two carbon atoms.

The present invention, while not restricted thereto, makes possible the preparation of compounds such as $C_4F_9CH_2CHClSi(CH_3)Cl_2$, which will be seen to differ significantly from the compounds of the Gordon patent in providing a terminal saturated-fluorocarbon radical of at least four carbon atoms and a chlorine atom, rather than a bromine or iodine atom, attached to a carbon atom of the alkenyl radical connecting the saturated-fluorocarbon radical and the silicon atom. The presence of a perfluorocarbon "tail" of at least four carbon atoms makes possible the imparting of oil- and ketone-repellency as well as water-repellency to surfaces treated with these compounds. The ability to produce a chlorine-substituted rather than a bromine- or iodine-substituted alkenyl chain between fluorocarbon and silicon portions permits reduction in the cost as well as the molecular weight of the compound. The chlorine-substituted compounds are also far superior to the bromine- and iodine-substituted compounds in their ability to avoid degradation and color change on exposure to light or heat.

The present invention, in terms of method, involves the reacting together, in the presence of a free-radical initiator, of saturated-fluorocarbon sufonyl chlorides or bromides and mono-olefinic silanes, with liberation of sulfur dioxide. The reaction may for convenience be expressed as follows:

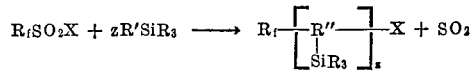

wherein $R_f$ is a saturated-fluorocarbon radical, X is chlorine or bromine, R' is a monoolefinic or cyclo-olefinic hydrocarbon radical, each R is a lower alkyl, lower alkoxy, phenyl, acyloxy, chloro or fluoro radical, R'' is a trivalent saturated hydrocarbon radical, i.e., an alkenyl radical, and z is 1 or 2

The free radicals required for the reaction may be generated by the application of heat, or electromagnetic radiation such as gamma rays, or actinic radiation such as ultraviolet light, to systems wherein the sulfonyl halides are thereby easily dissociated into free radicals. They may alternatively be generated by the addition of organic peroxides such as benzoyl peroxide, t-butylperbenzoate, diacetyl peroxide, or trichloroacetyl peroxide, in each case with the system at an appropriate temperature. Trichloroacetyl peroxide, for example, is effective at temperatures substantially below normal room temperature, whereas benzoyl peroxide ordinarily requires heating to 80–90° C. for best results. Other useful generators of free radicals include azo compounds such as decamethylenebismethylhydrazodicarboxylate, or triphenylmethane or triphenylmethylazobenzene. In all cases the reaction requires only the generation of free radicals in order to proceed. When an organic peroxide, hydroperoxide, or aliphatic azo compound is utilized as the free-radical-initiator superior yields and conversions are obtained when its concentration is in the range of about 1–15%, or preferably about 3–10%, based on the total weight of reactants.

The saturated-fluorocarbon sulfonyl chlorides and bromides employed in the processes of this invention include both perfluoroalkyl compounds such as perfluorobutane sulfonyl chloride, $C_4F_9SO_2Cl$, and perfluorocycloalkyl compounds such as perfluorocyclohexane sulfonyl chloride, $C_6F_{11}SO_2Cl$. The preparation of such compounds has been described in Brice et al., U.S. 2,732,398, the disclosures of which are incorporated herein by reference. The compounds having from one to 18 carbon atoms are useful in the process, but the saturated-fluorocarbon sulfonyl chlorides having at least four and not more than about 10 carbon atoms provide product compounds having significant advantages for a number of purposes hereinafter to be described, and are generally preferred.

The mono-olefinic silanes employed in the reaction of this invention are hereinbefore generically defined as having the formula $R'SiR_3$ wherein R' is a monounsaturated olefinic or cycloolefinic hydrocarbon radical and each R is a lower alkyl such as methyl or ethyl, lower alkoxy such as methoxy or ethoxy, acyloxy such as acetoxy, phenyl, chloro or fluoro radical, at least one of said R radicals being easily removable from the silicon atom by hydrolysis, as are the methoxy, acetoxy, chloro or fluoro radical. Typical specific compounds include

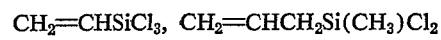

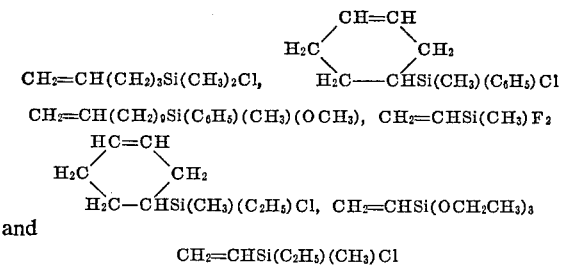

$CH_2=CH(CH_2)_3Si(CH_3)_2Cl$, $H_2C$—$CHSi(CH_3)(C_6H_5)Cl$ (cyclic with CH=CH, H₂C, CH₂)

$CH_2=CH(CH_2)_9Si(C_6H_5)(CH_3)(OCH_3)$, $CH_2=CHSi(CH_3)F_2$ $H_2C$—$CHSi(CH_3)(C_2H_5)Cl$ (cyclic with HC=CH, H₂C, CH₂),  $CH_2=CHSi(OCH_2CH_3)_3$ and $CH_2=CHSi(C_2H_5)(CH_3)Cl$ The saturated-fluorocarbon sulfonyl chloride or bromide may be employed in the same molar proportions as the mono-olefinic silane, or in lesser or greater proportions. It may be added all at once, or in small portions. A preferred procedure involves the continuous addition of the silane to the sulfonyl halide at a rate substantially the same as the rate of reaction, so that homopolymerization of the unsaturated silane compound is minimized. Since the reaction is exothermic, its progress may be determined reasonably accurately by measuring the temperature, or by noting the rate of reflux under appropriate conditions.

The major reaction product of the reaction ordinarily contains the fluorocarbon and silane residues in a 1:1 molar ratio. Telomeric products are also produced in many cases, and products of this nature have been shown by analysis to contain fluorocarbon and silane residues in 1:2 molar ratio; and residues having higher boiling or melting ranges and presumably still higher silane-to-fluorocarbon ratios are also obtained.

The reaction products of this invention, which contain hydrolyzable radicals attached to silicon, can be hydrolyzed to produce siloxane type polymeric materials.

Reaction products containing chlorine attached to silicon may be further reacted, e.g. with sodium acetate in benzene solution, to produce acetoxysilanes. Both the chlorosilanes and the acetoxysilanes are effective as surface treating agents, but the use of the latter type compound avoids liberation of HCl at the treated surface and is therefore indicated in the treatment of cellulosic or other surfaces which are adversely affected by the presence of HCl.

Since they contain both fluorocarbon radicals and silicon, the organic compounds resulting from the processes of this invention are valuable as intermediates in the synthesis of novel polymeric materials having superior solvent resistance and usefulness under wide ranges of temperature. They are also particularly useful as surface treating agents. As before indicated, the product compounds having a higher saturated-fluorocarbon radical $R_f$ of at least four carbon atoms are particularly useful in imparting both water-repellency and oil-repellency to surfaces treated therewith. In this respect they differ from otherwise similar compounds containing only one or two carbon atoms in the saturated fluorocarbon radical. Furthermore, these higher fluorocarbon compounds are effective as permanent mold release agents, e.g., when applied to plate glass surfaces used in the molding of epoxy resin panels. Glass surfaces treated with the higher fluorocarbon compounds of the invention have been shown to be highly resistant to wetting by ketone type solvents, e.g. acetone. Applied to glass fibers or fabrics, the compounds provide excellent water and oil repellency as well as repellency to acetone. In addition, the fabrics so treated are highly resistant to soiling and, surprisingly, are greatly improved in their ability to tolerate repeated flexing or folding.

The following specific examples will serve to illustrate, but not to limit, the principles of the invention.

Example 1

| | Grams |
|---|---|
| Vinylmethyldiethoxy silane | 11.0 |
| Perfluoromethane sulfonyl chloride | 13.0 |
| Benzoyl peroxide | 1.0 |

The three components are sealed in a glass ampoule and heated at 80–90° C. for 18 hours. The product is distilled under vacuum and yields a liquid product boiling at 108° C. under a reduced pressure of 60 mm. of mercury and having a refractive index $n_D{}^{25}=1.3861$. Analysis shows this product to correspond to the formula $CF_3CH_2CHClSiCH_3(OC_2H_5)_2$

*Analysis, percent.*—Calcd. for $C_8H_{16}O_2F_3ClSi$: C, 36.3; F, 21.5; Cl, 13.4. Found: C, 36.3; F, 21.5; Cl, 13.3.

The yield of this product is 45% of the theoretical yield based on the reaction $CF_3SO_2Cl+CH_2=CHSiCH_3(OC_2H_5)_2 \rightarrow$
$CF_3CH_2CHClSiCH_3(OC_2H_5)_2+SO_2$ Smaller amounts of high-boiling liquid product and of non-volatile residue are also noted.

The experiment is duplicated and a further amount of high-boiling liquid product is recovered. It consists largely of a compound boiling at 112° C./10 mm., having a refractive index $n_D{}^{25}=1.4340$, and showing the following analysis:

*Analysis, percent.*—Calcd. for $C_{15}H_{32}O_4F_3ClSi_2$: C, 42.5; F, 13.5; Cl, 8.4. Found: C, 42.2; F, 14.5; Cl, 8.9.

The compound is thus identified as

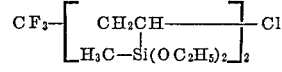

$$CF_3-\left[\begin{array}{c}CH_2CH-\\|\\H_3C-Si(OC_2H_5)_2\end{array}\right]_2-Cl$$

Example 2

| | Grams |
|---|---|
| Vinylmethyl dichlorosilane | 5.6 |
| Perfluoro octanesulfonylchloride | 20.8 |
| Di-tertiary butyl peroxide | 0.3 |

The three components are sealed in a glass ampoule and heated at 145° C. for 15 hours. Vacuum distillation of the reaction mixture results in the isolation of two well-defined reaction products.

Product A

Boiling point 157° C./60 mm. Hg
Refractive index $n_D{}^{25}=1.3581$
*Analysis, percent.*—Calcd. for $C_{11}H_6F_{17}Cl_3Si$: C, 22.2; F, 54.2; Cl, 17.9. Found: C, 22.2; F, 54.5; Cl, 18.1.

Product B

Boiling point 188° C./20 mm. Hg
Refractive index $n_D{}^{25}=1.3926$
*Analysis, percent.*—Calcd. for $C_{14}H_{12}F_{17}Cl_5Si_2$: C, 22.8; F, 43.8; Cl, 24.1. Found: C, 22.7; F, 44.1; Cl, 23.7.

The reactions may therefore be indicated as follows:

For Product A $C_8F_{17}SO_2Cl+CH_2=CHSiCH_3Cl_2\rightarrow$
$C_8F_{17}CH_2CHClSiCH_3Cl_2+SO_2$ For Product B $$C_8F_{17}SO_2Cl + 2CH_2=CHSiCH_3Cl_2 \longrightarrow C_8F_{17}-\left[\begin{array}{c}CH_2-CH-\\|\\H_3C-SiCl_2\end{array}\right]_2-Cl + SO_2$$

Example 3

| | Grams |
|---|---|
| Vinyl trichlorosilane | 13.0 |
| Perfluoro octanesulfonylchloride | 41.6 |
| Di-tertiary butyl peroxide | 0.5 |

The fluorocarbon sulfonyl chloride, peroxide, and about one-tenth of the silane are mixed and heated under reflux at atmospheric pressure. The remainder of the silane is added in small proportions as the reaction proceeds and at a rate just sufficient to maintain the vapor temperature in the flask at a point above the boiling point of the silane but well below the boiling point of perfluorooctane sulfonyl chloride. Heating is continued until reaction has ceased. Unreacted components are distilled off, and the remainder is then fractionated.

A first fraction is found to consist of the liquid reaction product of 1:1 molar proportions of the major reactants. It boils at 127° C./20 mm. Hg and has a refractive index $n_D^{25}=1.3598$.

Analysis, percent.—Calcd. for $C_{10}H_3F_{17}SiCl_4$: C, 19.5; F, 52.4; Cl, 23.0. Found: C, 19.6; F, 52.4; Cl, 23.0.

The yield of this product is 42% of the theoretical yield based on the amount of fluorocarbon sulfonyl chloride consumed.

A second, higher boiling fraction is found to be a telomeric product of one mol of the fluorocarbon sulfonyl chloride with two mols of the vinyl silane, boiling at 165° C./10 mm., refractive index $n_D^{25}=1.3950$, and corresponding to the structure

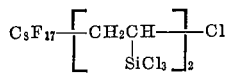

Analysis, percent.—Calcd. for $C_{12}H_6F_{17}Si_2Cl_7$: C, 18.6; F, 41.5; Cl, 32.0. Found: C, 19.0; F, 42.1; Cl, 31.5.

The yield of this material is 18% on the same basis.

A non-volatile residue remains in the still. It amounts to a yield of 14%, and contains higher telomeric products formed from still higher ratios of vinyl silane and fluorocarbon sulfonyl chloride. Such products correspond to the formula

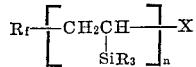

Where $n$ is an integer greater than 2.

When the same reactants in the same total amounts are pre-mixed and reacted as in Examples 1 and 2, the yield of the 1:1 product is decreased to 15% while the yield of high boiling material is increased to 25% and the residue to 38%, all based on the amount of fluorocarbon sulfonyl chloride consumed.

Example 4

| | Grams |
|---|---|
| Vinyl triethoxy silane | 7.6 |
| Perfluorooctane sulfonyl chloride | 20.8 |
| Benzoyl peroxide | 0.4 |
| Calcium carbonate (as acid acceptor) about | 1 |

The components are reacted as in previous examples. The yield of 1:1 reaction product is 67%, based on the amount of fluorocarbon sulfonyl chloride reacted. This product has a boiling point of 121° C./4 mm. Hg, a refractive index $n_D^{25}=1.3508$, and is identified by analysis.

Analysis, percent.—Calcd. for $C_{16}H_{18}O_3F_{17}ClSi$: C, 29.8; F, 50.1; Cl, 5.50. Found: C, 30.5; F, 50.6; Cl. 5.89.

The amounts of high-boiling liquid and on non-volatile residue obtained in this example are 2% and 18% respectively, based on the total weight of reaction product. The high-boiling liquid product is largely the 1:2 telomeric reaction product.

Example 5

The 1:1 reaction product of vinyl methyldichlorosilane and perfluoromethane sulfonyl chloride is prepared by methods analogous to those described hereinbefore, and is found to have the following constants:

Boiling point 75° C./64 mm.
Refractive index $n_D^{25}=1.4079$

Analysis, percent.—Calcd. for $C_4H_6F_3Cl_3Si$: C, 19.6; F, 23.2; Cl, 43.4. Found: C, 20.2; F, 23.5; Cl, 43.3.

There are also obtained high-boiling fractions including the 1:2 telomer analyzing as follows:

Boiling point 170° C./64 mm.
Refractive index $n_D^{25}=1.4529$

Analysis, percent.—Calcd. for $C_7H_{13}F_3Cl_5Si_2$: C, 21.7; F, 14.7; Cl, 46.0. Found: C, 20.8; F, 14.7; Cl, 46.5.

A small amount of non-volatile residue is also recovered.

Example 6

Vinylmethyldiethoxysilane and perfluorooctane sulfonyl chloride are reacted in the presence of benzoyl peroxide and an acid acceptor to produce a 75% yield, based on consumption of the second reactant, of a 1:1 reaction product having a boiling point of 112° C./4 mm., refractive index $n_D^{25}=1.3512$, and analyzing as follows:

Analysis, percent.—Calcd. for $C_{15}H_{16}F_{17}ClO_2Si$: C, 29.3; F, 52.5; Cl, 5.77. Found: C, 29.0; F, 52.9; Cl, 6.18.

Small amounts of higher molecular weight materials are also recovered.

Example 7

Cyclohexenyl trichlorosilane is reacted with perfluorooctyl sulfonyl chloride at about 100–110° C. in substantially equimolar ratio and in the presence of di-t-butyl peroxide catalyst by essentially the procedure shown in Example 3 except that part of the catalyst is dissolved in each of the reactants. There is obtained as a reaction product a compound which when isolated and analyzed is found to be represented by the formula

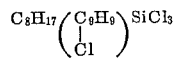

wherein the $C_6H_9$ radical is a trivalent 6-member saturated hydrocarbon ring, i.e. the cyclohexenyl radical.

Example 8

Cyclohexenyl trichlorosilane is mixed with an approximately equal molar quantity or trifluoromethyl sulfonyl chloride and with catalytic amounts of di-t-butyl peroxide, and heated, in this instance in a sealed tube, yielding the product

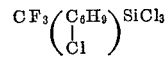

Example 9

Cyclohexenyl trichlorosilane containing di-t-butyl peroxide catalyst is slowly added to a substantially equimolar amount of perfluorobutyl sulfonyl chloride also containing catalyst, the reaction proceeding under reflux to produce the reaction product

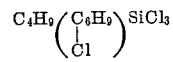

Example 10

A mixture of 120 ml. of heptane, 29.8 g. of $CH_2=CH(CH_2)_9SiCl_3$ and 25.8 g. of $C_8F_{17}SO_2Br$ is irradiated with ultra violet light while under continuous stirring, and is gradually heated to reflux and held under reflux for two hours. Heptane and excess silane is removed by distillation. There is recovered 2.4 grams of product, B. 200° C./0.2–0.25 mm. Hg, $n_D^{25.5}=1.4019$, and further shown by infra-red analysis to consist largely of $C_8F_{17}CH_2CHBr(CH_2)_9SiCl_3$.

Example 11

To a solution of 18.4 g. of $CH_2=CH(CH_2)_9SiCl_3$ and 1 ml. di-t-butyl peroxide in 100 ml. heptane under rapid stirring and at reflux temperature there is added dropwise 33.2 g. of $C_8F_{17}SO_2Cl$ containing 4 ml. di-t-butyl peroxide dissolved therein, the addition being at a rate just sufficient to maintain reflux without external heating and therefore at substantially the same rate as the reaction. On distillation under reduced pressure there is recovered 26.1 g. of $C_8F_{17}CH_2CHCl(CH_2)_9SiCl_3$, B. 161–165° C./ 0.25 mm. Hg, $n_D^{25.5}=1.3929$. Due to unavoidable hydrolysis, the analysis for chlorine shows 18.0%, theor. 19.1%.

Example 12

The compound

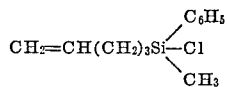

is first prepared from CH≡CH(CH₂)₃Br by the Grignard reaction. To 24.7 g. of the monoolefinic silane and 1 ml. of di-t-butyl peroxide dissolved in 100 ml. heptane and preliminarily heated just to reflux there is added a solution of 4 ml. di-t-butyl peroxide in 35.1 g. of C₄F₉SO₂Cl under constant stirring and at approximately the same rate at which reaction proceeds, as indicated by maintained reflux. Distillation under reduced pressure yields a total of 26 g., B. 112–115° C./0.2 mm. Hg, $$nD^{25.4} = 1.4429$$

consisting mainly of the product compound

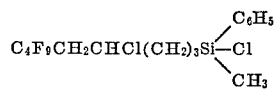

Example 13

The chlorine atoms attached to the silicon atom are replaced by acetoxy radicals in the product of Example 3, by reaction with sodium acetate in benzene solution, to produce $C_8H_{17}CH_2CHClSi(-O_2C-CH_3)_3$. Analogous substitution may be accomplished with the products of Examples 2, 5 and 7–12 by similar procedures.

The hydrolyzable $R_fR''XSiR_3$ products are soluble in volatile liquids such as hydrocarbons and chlorofluorohydrocarbons, and may be applied to various surfaces by wiping, or dipping, or spray coating, or in other ways.

In general the bond between silicon and chlorine, fluorine, short chain primary alkoxy, or acyloxy radicals is readily broken by hydrolysis, whereas the silicon-to-carbon bond is highly resistant to hydrolysis. Tertiary-alkoxy and long-chain alkoxy radicals form bonds with silicon which are of intermediate resistance to hydrolysis, as do certain substituted alkoxy radicals such as chlorinated tertiary alkoxy radicals. These factors are of importance in selecting specific vinyl silanes for specific applications.

Applications of the novel products of this invention as intermediates in the synthesis of polymeric products having novel combinations of properties has previously been suggested herein. The products containing hydrolyzable radicals may, for example, be hydrolyzed either alone or together with other chlorosilanes or the like to provide novel hydrolysis products which may then be further reacted to form polysiloxane type materials having unusual properties.

In one example, the 1:1 reaction product of perfluorooctane sulfonyl chloride and vinyl methyl dichlorosilane is mixed with a slightly greater molar quantity of methyl dichlorosilane and the mixture hydrolyzed in water to give a viscous oil which when heated in an oven at 180° C. in thin film form is converted to a heat-stable transparent film which is neither dissolved nor swollen by organic solvents. When applied as a solution in benzotrifluoride to cotton cloth and then dried and cured, the product imparts to the cloth the property of repellency to both water and oil. The oily product is also coated on glass and found to provide a firmly bonded surface coating which is water and oil repellent.

On the other hand, it is found that those reaction products in which the terminal perfluoroalkyl radical contains less than four carbon atoms, while imparting a reasonable degree of water-repellency, is entirely ineffective in imparting oil-repellency to various surfaces. As an example, clean glass surfaces are treated with the reaction products of Examples 8 and 9, e.g. by spraying the glass, heated to 150° C., with a solution of the material in an aerosol solvent or by spraying the cold glass followed by polishing with a cloth moistened with isopropyl alcohol, and are tested for water-repellency and oil-repellency by placing droplets of the appropriate liquid on the treated surface of the horizontal glass panel, slowly tilting the panel, and noting the angle at which the droplets freely roll down the incline. In the following tabulation the numbers refer to the angle of the panel with the horizontal at which such rolling occurs.

| Compound | Water | Kerosene |
| --- | --- | --- |
| $CF_3-(C_6H_9)-SiCl_3$ | 23–27 | (¹) |
| $\quad\quad\quad\quad\;\;Cl$ | | |
| $C_4F_9-(C_6H_9)-SiCl_3$ | 26–30 | 8–14 |
| $\quad\quad\quad\quad\;\;Cl$ | | |

¹ Wets out.

The results obtained with the CF₃— compound, in the static test described and with respect to the action of both water and kerosene, are very similar to those obtained with a variety of hydrocarbon silanes wherein the hydrocarbon group may contain from one up to 18 carbon atoms. The C₄F₉ fluorocarbon chain silane shows a significant degree of repellency to kerosene, and this effect increases with increasing fluorocarbon chain length. With respect to water-repellency in the static test described, it is seen that the C₄F₉ fluorocarbon chain silane provides no significant improvement over the CF₃ compound; and similar results are obtained with silanes having still longer fluorocarbon chains, e.g., C₈F₁₇. On the other hand, under certain dynamic test and use conditions a quite unexpected difference is made apparent between the hydrocarbon and lower fluorocarbon compounds and the higher fluorocarbon compounds. When these various compounds were evaluated as rain-repellent surface treatments for automotive windshields, many drivers reported them to be completely unsatisfactory. In contrast, when similarly evaluated on windshields of high speed aircraft, the pilots invariably reported that the long chain fluorocarbon silanes provided markedly superior rain repellency to that obtained with hydrocarbon silane treatments commercially available for this purpose.

The higher fluorocarbon organosilanes of the present invention possess the unique property of imparting to surfaces treated therewith a high resistance to acetone and similar ketone type solvents. The compounds are therefore useful in treating containers for lacquers or the like prepared with ketone type solvents. The property is conveniently measured by observing the action of droplets of the solvent placed on a treated dry flat horizontal surface, as will now be described.

Flat glass test plates are first thoroughly cleaned by washing with soap and water, rinsing with water, and immersing in acetone. They are then dipped into a solution of the appropriate fluorochemical at one-half percent concentration in acetone or a mixture of acetone and methyl chloroform, drained, and permitted to dry. The dried plates are first dipped a few times in clean acetone to remove any excess of the material, leaving the surface covered with a monomolecular film. In this condition each of the test panels is water-repellent, whereas the panels as initially cleaned are wet out completely both with acetone and with water. The panels are next held in horizontal position and a small drop of acetone is placed on each. On panels treated with the compound $C_8F_{17}CH_2CHClSiCH_3Cl_2$ of Example 2 or with the compound $C_4F_9(C_6H_9)ClSiCl_3$ of Example 9, the droplet of acetone remains in the form of a slightly flattened sphere. On panels treated with commercial available fluorochemical treating agents known to render surfaces treated therewith highly oleophobic, the acetone droplets spread out immediately over the entire test plate surface. The specific compounds tested in this comparison include

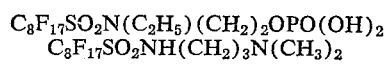

$C_8F_{17}SO_2NH(CH_2)_3N(CH_3)_2 \cdot C_{10}H_{21}Br$
$C_8F_{17}SO_2NH(CH_2)_3N(CH_3)_3 \cdot I$
$C_7F_{15}CONH(CH_2)_3N(C_2H_5)_2$ The ability of surfaces treated with the higher fluorocarbon compounds of this invention, i.e., wherein $R_f$ contains four to ten carbon atoms, to resist wetting with ketone type solvents is unexpected in view of the inability of the comparison higher fluorocarbon compounds to achieve any such result, particularly since these same comparison compounds have been shown to impart a high degree of water-repellency and oil-repellency to a variety of surfaces.

Another surprising property of the higher fluorocarbon compounds of this invention as above defined in their ability, when applied to glass fiber fabric materials, to improve greatly the ability of the fabric to resist deterioration under repeated flexing. Many treating agents for glass fibers and glass fabrics have been suggested, but previous treatments have been only moderately successful for the purpose just indicated and have been subject to the disadvantage of decreasing the ability of the fabric to resist soiling. The novel compounds here described, on the contrary, provide both increased resistance to soil and a very considerable increase in fabric life under use conditions, as will now be shown.

Samples of glass fabric are treated with the several compounds in solution at the stated concentration by a padding technique, and dried. Strips ¾ inch in width are cut from the untreated fabric and from each treated sample and are subjected to a standard fold test, viz. the MIT Folding Endurance Test using a 1.5 kg. weight, results being reported as number of flexes to cause failure.

Using a fabric identified as Hess-Goldsmith Style 401, Finish 112, the untreated fabric breaks in 12 flexes. Treated with a commercial dimethylsilicone material, "I-524" silicone, the fabric withstands 682 flexes. Treated with the compound of Example 2, $C_8F_{17}CH_2CHClSiCH_3Cl_2$ the fabric withstands 2000 flexes before breaking.

A similar test is conducted using Hess-Goldsmith glass fabric Style 138 but Finish 210. The untreated fabric withstands 1600 flexes. Treated with the "I-524" polydimethylsilicone in 2% solution, the fabric withstands 5000 flexes. Treatment at only 1% with the compound of Example 2 increases the life to 7100 flexes; applied at 10% concentration, the compound extends the fabric life to a total of 26,000 flexes.

In another test an improved fabric identified as Hess-Goldsmith Style 138 beta, Finish 112 is chosen. The untreated fabric withstands 16,000 flexes. Treatment with the 2% "I-524" silicone solution in this case reduces the test life to 12,600 flexes. The product of Example 2 applied as a 1% solution on the contrary increases the test life to 25,600 flexes; and at 10% concentration of the same compound the test life is increased to a surprising 209,000 flexes.

A measure of soil resistance may be made by tumbling the treated or untreated fabric with a quantity of dry "standard soil," measuring the optical reflectivity of the soiled surface, and then laundering the fabric and again measuring the optical reflectivity. The results are commonly reported in "soil units," and typical test results follow as determined on a standard white tablecloth type of glass fabric.

|  | After dry soiling | After laundering |
|---|---|---|
| Untreated fabric | 2.74 | 0.12 |
| Treated with "I-524" silicone | 1.50 | 0.78 |
| Treated with product of Example 2 | 1.17 | 0.11 |

Similar results are obtained using the other higher fluorocarbon organosilanes of the present invention. The effect is not obtained with silanes having hydrocarbon or short chain, e.g. perfluoromethyl or perfluoroethyl, fluorocarbon groups.

The products of the present invention wherein two or more of the R groups attached to silicon are readily hydrolyzable have further utility in the preparation of high molecular weight or polymeric products, as will now be shown.

A mixture of 10 grams of the 1:1 reaction product of perfluorooctane sulfonyl chloride and vinyl methyl dichlorosilane is mixed with 2.2 grams of dimethyldichlorosilane and the mixture hydrolyzed by adding it dropwise to 50 ml. of water at room temperature with constant stirring. An oily hydrolyzate is obtained which is separated from the aqueous layer, purified by dissolving in xylene hexafluoride and washing with water, and heated to remove the solvent. The resulting partially polymerized purified oily product is acidfied with one percent of its weight of concentrated sulfuric acid and heated, causing increase in viscosity and eventual solidification of the material.

Polymeric products are also obtainable from certain of the fluorocarbon-radical-containing organosilicon products of this invention by other reactions which do not involve direct hydrolysis but, since the products are siloxanes, may be considered fully equivalent to the hydrolysis and polymerization reactions just described. For example, a monoalkyl mono(perfluoroalkylchloroalkyl) silicon dichloride may be homopolymerized by reaction with a metal oxide such as zinc oxide, with removal of chlorine atoms from the silicon atoms and formation of a polymeric compound containing the siloxane linkage. The linear siloxane polymers produced from those compounds of this type which have only two easily hydrolyzable radicals attached to silicon have a skeletal chain containing recurring units indicated by the general formula:

Either the 1:1 or the 1:2 reaction products of Example 1 may be similarly hydrolyzed and the resulting oily products in either instance may be then cross-linked. When cross-linking is carried out by irradiation with beta rays, a soft rather crumbly but somewhat elastic polymer is obtained.

The polymers obtained from the hydrolysis products of the 1:1 reaction products or 1:2 or higher telomers of this invention may be in the form of highly stable and inert oils, heat-curing reactive liquids, or solids of widely differing properties, depending on the specific raw materials employed and in particular on the number of hydrolyzable radicals in the molecule. The polymeric products are useful as lubricants, hydraulic fluids, surface treatments and coatings, and for other purposes.

In some of the examples the reactions involved have been expressed in terms of the addition of the fluorocarbon radical to the double bond of the mono-olefinic silane in a position beta to the silicon atom. It may be that some alpha-addition also occurs, and therefore it is not desired to be limited to the specific structures here indicated. Rather it is suggested that these structural formulas should be understood, at least in the case of the chain compounds, as indicating the most probable structure of the majority of the product obtained from the reaction and corresponding to the empirical formula. However the observed excellent stability of the compounds obtained, when subjected to high temperatures, mild hydrolysis conditions, and the like, strongly indicate that the halogen atom of the fluorocarbon sulfonyl halide is added alpha to the silicon atom of the vinyl silane.

Likewise in the compounds of Examples 7–9 position of the substituent groups on the cyclohexane ring is not known with certainty although the empirical formula is as indicated.

What is claimed is an follows:

1. The method of making a compound of formula

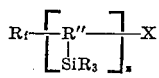

which comprises mixing together a silane R'SiR₃ and a saturated-fluorocarbon sulfonyl halide R$_f$SO₂X and and generating free radicals in the mixture to permit reaction to proceed with formation of said compound and liberation of sulfur dioxide, and wherein R$_f$ is a saturated-fluorocarbon structure containing 1 to 18 carbon atoms each of which is present in a group selected from the class consisting of perfluoroalkyl and perfluorocyclohexyl groups, each R is selected from the class consisting of lower alkyl, lower alkoxy, acetoxy, phenyl, chloro, and fluoro radicals, at least one of said R radicals being further selected from the subclass consisting of chloro, fluoro, short chain primary alkoxy, and acetoxy radicals, R' is selected from the class consisting of cyclohexenyl and terminally unsaturated alkenyl radicals, R'' is a trivalent saturated hydrocarbon radical having the same empirical formula as R', X is selected from the class consisting of chlorine and bromine, and z is at least one and not more than two.

2. The method of claim 1 wherein R' is a terminally unsaturated hydrocarbon radical having the structure CH₂=CH(CH₂)$_n$, wherein $n$ is an integer not greater than 9.

3. The method of claim 2 wherein R' is a vinyl radical.

4. The method of claim 1 wherein R' is a cyclohexenyl radical.

5. The method of claim 1 in which the silane is added to the reaction mixture in small successive portions during the reaction and at a rate corresponding to the rate of the reaction.

6. The telomeric compound

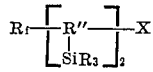

wherein R$_f$ is a saturated-fluorocarbon structure containing 1 to 18 carbon atoms each of which is present in a group of the class consisting of perfluoroalkyl and perfluorocyclohexyl groups, R'' is a trivalent saturated hydrocarbon radical of at least two carbon atoms and is bonded to R$_f$ and to X at different carbon atoms, each R is selected from the class consisting of lower alkyl, lower alkoxy, phenyl, fluoro, chloro, and acetoxy radicals, at least one of said R radicals being further selected from the subclass consisting of chloro, fluoro, short chain primary alkoxy, and acetoxy radicals, and X is selected from the class consisting of chlorine and bromine.

7. The telomeric compound

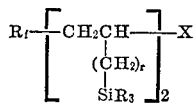

wherein R$_f$ is a saturated-fluorocarbon structure containing 1 to 18 carbon atoms each of which is present in a group of the class consisting of perfluoroalkyl and perfluorocyclohexyl groups, each R is selected from the class consisting of lower alkyl, lower alkoxy, phenyl, fluoro, chloro, and acetoxy radicals, at least one of said R radicals being further selected from the subclass of chloro, fluoro, short chain primary alkoxy, and acetoxy radicals, X is selected from the class consisting of chlorine and bromine, and $n$ is an integer not greater than 9.

8. The telomeric compound

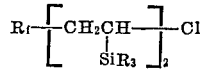

wherein R$_f$ is a saturated-fluorocarbon structure containing 1 to 18 carbon atoms each of which is present in a group of the class consisting of perfluoroalkyl and perfluorocyclohexyl groups and each R is selected from the class consisting of lower alkyl, lower alkoxy, phenyl, fluoro, chloro, and acetoxy radicals, at least one of said R radicals being easily removed from the silicon atom by hydrolysis and being from the subclass of chloro, fluoro, short chain primary alkoxy, and acetoxy radicals.

9. The saturated-fluorocarbon organosilane compound R$_f$R''ClSiR₃ wherein R$_f$ is a saturated-fluorocarbon structure containing four to ten carbon atoms each of which is present in a group of the class consisting of perfluoroalkyl and perfluorocyclohexyl groups, R'' is a trivalent saturated hydrocarbon radical of at least two carbon atoms and is bonded to R$_f$ and to Cl at different carbon atoms, and each R is selected from the class consisting of lower alkyl, lower alkoxy, phenyl, fluoro, chloro and acetoxy radicals, at least one of said R radicals being easily removed from the silicon atom by hydrolysis and being from the subclass of chloro, fluoro, short chain primary alkoxy and acetoxy radicals.

10. The compound C₈F₁₇CH₂CHClSiCH₃Cl₂.

11. The compound C₈F₁₇CH₂CHClSiCl₃.

12. The compound

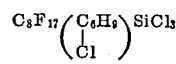

wherein the radical (C₆H₉) is the cyclohexenyl radical.

13. The compound

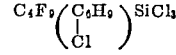

wherein the radical (C₆H₉) is the cyclohexenyl radical.

14. The compound

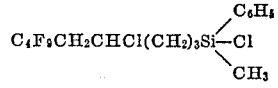

15. The compound C₈F₁₇CH₂CHClSi(OC₂H₅)₃.
16. The compound C₈F₁₇CH₂CHClSi(CH₃)(OC₂H₅)₂.
17. The compound C₈F₁₇CH₂CHCl(CH₂)₉SiCl₃.
18. The compound C₈F₁₇CH₂CHClSi(O₂CCH₃)₃.

References Cited

UNITED STATES PATENTS 2,715,113  8/1955  Gordon _____ 260—448.2
2,732,398  1/1956  Brice et al. _____ 260—503

OTHER REFERENCES

Moeller, "Inorganic Chemistry," John Wiley and Sons, Inc., N.Y. (1952) pp. 417–418.

HELEN M. McCARTHY, *Primary Examiner.*

PAUL F. SHAVER, *Assistant Examiner.*

U.S. Cl. X.R.

260—448.8; 117—24